Aug. 27, 1963  J. J. FALLS  3,101,524
CUTTER BUNDLE
Filed Dec. 15, 1961
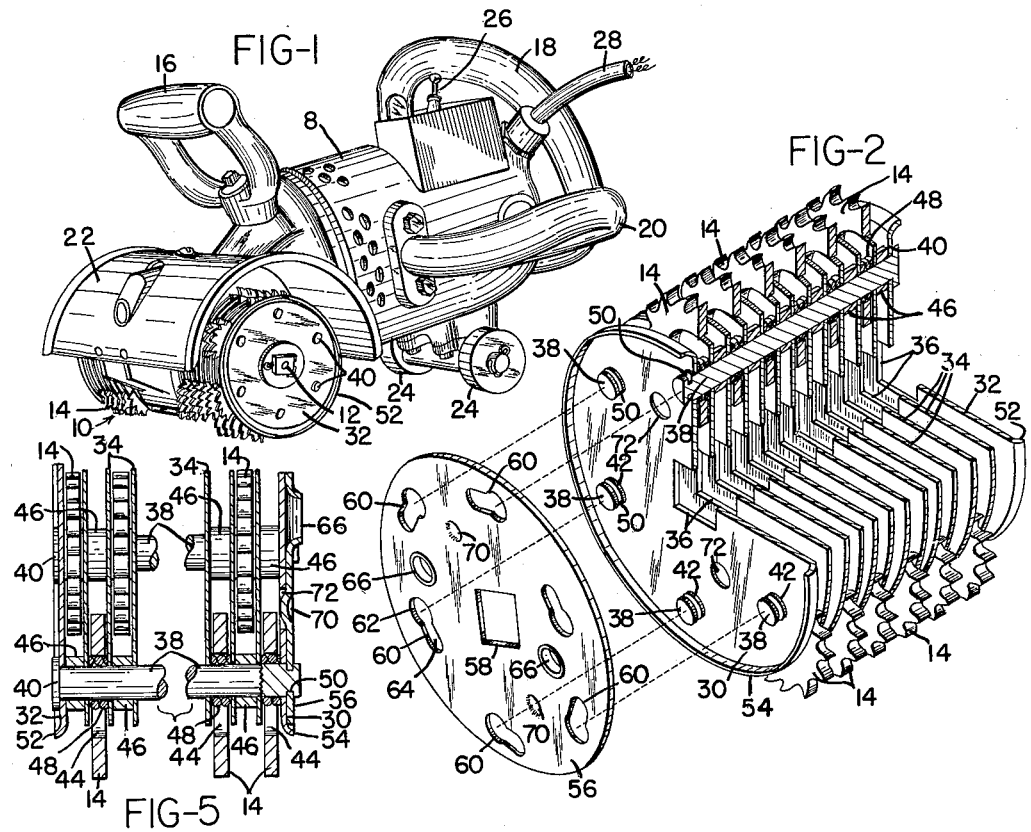
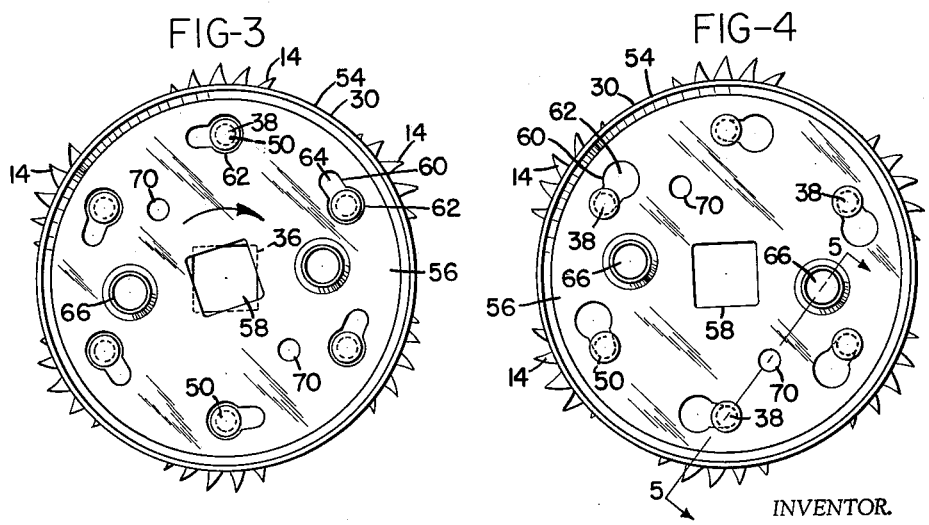
INVENTOR.
JOHN J. FALLS
BY
*J. Warren Kinney, Jr.*
ATTORNEY

United States Patent Office 3,101,524
Patented Aug. 27, 1963

3,101,524
CUTTER BUNDLE
John J. Falls, Mack, Ohio, assignor to Aurand Mfg. & Equip. Co., Cincinnati, Ohio, a corporation of Ohio
Filed Dec. 15, 1961, Ser. No. 159,554
4 Claims. (Cl. 29—81)

This invention relates to a surface cleaning tool, such as may be used in removing from a surface various coatings including rust, paint, scale and the like.

The invention constitutes an improvement over the device disclosed in the U.S. Patent of Aurand, No. 1,874,220, issued August 30, 1932, particularly as concerns the bundle of impact elements or cutters which operate upon the work in removing deposits therefrom.

An object of the invention is to provide in a surface cleaning tool or the like an improved construction of cutter bundle having the advantages of quick and easy assembly and replacement of parts when needed, thereby resulting in savings of initial manufacturing and assembling costs, and further savings of time and labor in use of the tool by the purchaser.

Another object is to enhance safety of use of the tool in practice, by eliminating delicate or inherently weak constituent parts subject to failure during use of the tool.

A further object is to eliminate the use of extending parts which might during use of the tool catch onto the clothing or the person of the user, with possible injury resulting.

The foregoing and other objects are attained by the means described herein and illustrated upon the accompanying drawing, in which:

FIG. 1 is a perspective view of a surface cleaning tool embodying the present invention.

FIG. 2 is a perspective cut-away view in partly exploded form, showing details of the improved cutter bundle.

FIG. 3 is an end view of the cutter bundle, showing the same in assembled but unlocked condition.

FIG. 4 is a view similar to FIG. 3 showing the cutter bundle in fully assembled locked-up condition.

FIG. 5 is an enlarged fragmentary cross-sectional view taken on line 5—5 of FIG. 4.

The surface cleaning tool comprises in general a housing 8 for an electric or pneumatic motor having a forwardly extending shaft including means for rotating the cutter bundles 10 with their common spindle 12, thereby to extend the multiplicity of loosely mounted cutters or impact elements 14 by centrifugal action, against a workpiece to be cleaned, as will be explained.

The tool shown by way of example is a portable device, having handles 16, 18 and 20 to be grasped in passing the cutter assembly bodily over the work to be cleaned. At 22 is indicated a stationary guard or hood disposed over the cutters to intercept flying particles dislodged from the work by the cutters. The housing 8 may carry suitable means here shown as wheels or rollers 24 for minimizing frictional contact of the apparatus upon the workpiece, in the interest of ease of operation with a gliding motion. If the tool is of the electric motor driven type as shown, it may be provided with a control switch 26 and the usual electric supply cord 28.

The apparatus generally described and shown herein by way of example is subject to various changes or modifications, as the present invention is directed to the cutter bundle per se, whether or not it is used in a cleaning tool of the type shown. In some instances, the cutter bundle may be incorporated in a different type machine wherein the workpiece is brought to and applied against one or more rotating cutter bundles carried upon a stationary frame or bed. In any such machine variations, the present invention is to be considered applicable.

The cutter bundle illustrated may comprise two opposed end plates or head plates 30 and 32, disc-like in form, and between which is embraced a series of intermediate spaced discs or plates 34 of approximately the same diameter, all subject to bodily rotation in unison about their aligned axes when driven by the motor of the tool. As indicated upon the drawing, all of the plates or discs have a central squared or angled opening 36 receptive of the drive spindle 12, which likewise is squared or angled complementarily to the openings 36, thereby enforcing rotation of the discs with the spindle when assembled and in use.

Each disc, including the end or head discs, is provided with a circular row of apertures, receptive of the pins 38 having heads 40, said apertures being indicated at 42. Pins 38 are adapted to support the cutters 14, which cutters have enlarged central bores or openings 44 through which the pins pass, to limit outward bodily projection of the cutters beyond the peripheries of the spaced discs, by the action of centrifugal force as the bundle is rapidly rotated. Spacing collars 46 are provided between all the discs, and are preferably supported by the pins 38, to provide for freedom of bodily shifting and rotation of the cutters between successive discs. The spacing collars are to be slightly longer than the thickness of the cutters, in order to provide the necessary clearance for rotation and bodily shifting of the cutters between the discs.

The numerals 48 indicate shock absorbing elements which may be in the form of resilient wire coils surrounding the pins 38 within the confines of the cutter apertures 44, these coils acting to absorb rebound of the cutters as their serrated outer peripheries strike the workpiece in the course of the cleaning operation. The purpose of the shock absorbing coils is to reduce any tendency of the metal to crystallize, in the cutters and the pins, incident to extended usage of the tool.

It may here be noted that each cutter support pin 38, at the end opposite its head 40, is provided with a circumferential annular groove or recess 50 which, in the assembled condition of the cutter bundle, is exposed exteriorly of the plane of the end disc or plate 30. These grooves or recesses 50 form elements of locking devices which maintain the bundles in assembled condition, as will be explained. The disc apertures 42 receiving the pins 38 are by preference equally spaced apart in all the discs, and will all be equidistant from the disc axes. Said apertures 42 in every instance, are spaced from the periphery of their respective discs.

At this stage of the description it may be advantageous to explain how the bundle is assembled. It may be noted that end plate or disc 32 has an outwardly extending peripheral flange 52, the depth of which may be substantially equal to the thickness of each head 40 of the cutter support pins 38. Accordingly, if the several pins 38 are inserted into the several openings 42 of plate 32, with the heads 40 of the pins encompassed by flange 52 as in FIG. 5 at the left, it will be possible to place the plate 32 upon a flat surface with its flange 52 and all the heads 40 resting upon such surface, so that the several pins will stand vertically spaced in correspondency with the spacings between the plate openings 42.

With the pins upstanding as explained, the assembler may drop spacers 46 and cutters 14 onto the upper ends of the pins, alternate pins receiving the spacers, and the remaining pins receiving the cutters, so that the cutters are staggered with relation to the spacers, as indicated by FIG. 5. Along with the cutters, the shock absorbing elements 48 may be applied, so as to rest within the enlarged center opening of each cutter. Thus, in the example shown, three spacers and three cutters and three shock absorber elements will rest upon the inner face of plate 32 all in a common plane.

Following the steps above recited, the assembler applies to the upstanding pins an intermediate plain disc or plate 34, which covers all the parts previously applied to the pins. Then the application of cutters, spacers, and shock absorbers is repeated so that these parts will rest upon the intermediate plain disc or plate just mentioned. By continuing such procedure, the bundle is finally built up until the last plate 30 is applied, this being the lockable end plate shown with the annular grooves or recesses 50 exposed at the outer face of said plate. End plate 30 has an outwardly extended peripheral flange 54, which in depth approximates the distance the pins 38 extend outwardly beyond the plane of said plate.

Attention is now directed to an element 56 which constitutes a lock plate or disc performing to releasably lock up the entire assembly of alternated discs and cutters. The lock plate may be a flat metallic disc punched to provide a central aperture 58, and a series of key-holes 60 spaced apart each to receive in its enlarged head portion 62 one of the pins 38, as indicated by FIG. 3.

As will be observed, the lock plate 56 rests flatwise against the outer face of end plate 30, and is confined by the flange 54 thereof.

By rotating the lock plate from the FIG. 3 position to the FIG. 4 position, a distance of several degrees, the annular grooves or recesses 50 of the pins will be engaged by the necks 64 of the key-holes, to lock the lock plate upon all the pins simultaneously, thereby to hold the entire bundle in assembled condition. In this condition, the squared or angled opening 58 of the lock plate will match the similar openings of all the other plates and discs, for accommodating the drive shaft 12 which is complementarily shaped and dimensioned.

Rotation of lock plate 56 to and from the positions of FIGS. 3 and 4, may be facilitated by providing said plate with sockets such as 66 for accommodating a spanner wrench or similar tool for rotating the plate.

The numerals 70 indicate indentations or detents pressed inwardly of the lock plate, adapted to frictionally engage holes 72 formed in the end plate 30, as the lock plate is rotated to the locked or home position of FIG. 4. These detents serve to prevent accidental unlocking of the bundle assembly when handled during mounting or demounting relative to drive shaft 12. At other times, or when the bundle is mounted upon the drive shaft, accidental or unintentional unlocking is positively prevented by reason of the angular drive shaft extending through the aligned center openings 58 and 36 of the several plates. The bundle or bundles applied to the drive shaft 12 may be secured thereon in any suitable manner, or as disclosed in the Aurand Patent No. 1,874,220 previously mentioned herein.

The ease with which worn cutters or impact elements may be replaced by new or reconditioned cutters is readily evident. Disassembly is quickly effected by merely rotating the lock plate 56 from the FIG. 4 position to the position of FIG. 3, whereupon the several pins 38 may be pulled from the structure at the heads 40, causing the entire assembly to fall apart in readiness for reassembly with new cutters.

It is to be understood that various changes and modifications may be made in the structural details of the device, within the scope of the appended claims, without departing from the spirit of the invention.

What is claimed is:

1. A cutter bundle for surface cleaning tools, comprising in combination, a first and a second end plate and a series of intermediate discs, said end plates and discs each having a circular row of transverse apertures substantially equally spaced from the centers of said plates and discs, said end plates each having an outer face, a series of elongate pins each having a head on one end and a locking recess in and across the opposite end thereof, the pins passing through corresponding apertures of the plates and discs, with the heads of the pins abutting the outer face of the first end plate, and the opposite ends of the pins projecting through the second end plate apertures to dispose the locking recesses thereof adjacent to the outer face of said second end plate, cutter elements mounted upon the pins between successive discs and plates, with portions of the cutter elements projecting beyond the discs, a disc-like lock plate adapted to be disposed substantially flatwise upon the outer face of the second end plate, said lock plate being provided with key-hole apertures in number corresponding to the number of pins aforesaid, each key-hole aperture having an enlarged end receptive of the pin diameter when the lock plate is placed against said face of the second end plate and a reduced end receptive of the locking recess of a pin when the lock plate is rotated relative to the second end plate to bundle lock-up position wherein the pins have locking engagement in the reduced end portions of the key-hole apertures, said end plates and discs having central aligned shaft receiving openings of polygonal contour and said lock plate having a correspondingly contoured central shaft receiving opening so oriented with respect to said key-hole apertures as to assume operative relationship to the plate and disc openings only upon rotation to said lock-up position.

2. The invention according to claim 1, with means for effecting a locking coupling between the lock plate and the said second end plate upon rotation of the lock plate to said bundle lock-up position to prevent accidental reverse rotation of the lock plate.

3. The invention according to claim 2, wherein the said means for effecting a locking coupling between the lock plate and the second end plate comprises a detent carried by one of such plates for frictional engagement in an aperture in the adjacent other one thereof.

4. The invention according to claim 1 wherein said lock plate has socket means thereon for accommodating a lock plate actuating tool by which to rotate the lock plate to said bundle lock-up position.

References Cited in the file of this patent
UNITED STATES PATENTS

| | | |
|---|---|---|
| 2,199,383 | Aurand | May 7, 1940 |
| 2,616,229 | Allison | Nov. 4, 1952 |
| 2,616,230 | Hough | Nov. 4, 1952 |
| 2,784,482 | Emmons | Mar. 12, 1957 |